US008560690B2

(12) United States Patent
Chandrasekaran et al.

(10) Patent No.: US 8,560,690 B2
(45) Date of Patent: Oct. 15, 2013

(54) AUTOMATIC ASSIGNMENT OF SERVICES TO SERVERS IN A MULTI-SERVER SYSTEM

(75) Inventors: Sashikanth Chandrasekaran, San Jose, CA (US); Gary D. Young, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 3451 days.

(21) Appl. No.: 10/899,680

(22) Filed: Jul. 26, 2004

(65) Prior Publication Data

US 2005/0246441 A1 Nov. 3, 2005

Related U.S. Application Data

(60) Provisional application No. 60/562,735, filed on Apr. 16, 2004.

(51) Int. Cl.
*G06F 15/173* (2006.01)
*G06F 9/46* (2006.01)

(52) U.S. Cl.
USPC ............ 709/226; 709/224; 718/101; 718/100

(58) Field of Classification Search
USPC .......................... 718/101, 100; 709/224, 226
See application file for complete search history.

(56) References Cited

U.S. PATENT DOCUMENTS

| 5,819,033 | A | 10/1998 | Caccavale |
| 5,928,344 | A | 7/1999 | Stierli |
| 6,154,813 | A | 11/2000 | Martin et al. |
| 6,405,257 | B1 | 6/2002 | Gersht et al. |
| 6,427,166 | B1 | 7/2002 | Hurst et al. |
| 6,442,564 | B1 | 8/2002 | Frey et al. |
| 6,542,930 | B1 | 4/2003 | Auvenshine |
| 6,681,251 | B1 | 1/2004 | Leymann et al. |
| 6,687,735 | B1 * | 2/2004 | Logston et al. ............... 709/203 |
| 6,718,361 | B1 * | 4/2004 | Basani et al. ................. 709/201 |
| 6,963,899 | B1 * | 11/2005 | Fernandez et al. ........... 709/203 |
| 7,334,013 | B1 * | 2/2008 | Calinov et al. ............... 709/201 |
| 7,467,387 | B2 * | 12/2008 | Mayes et al. .................. 719/314 |

OTHER PUBLICATIONS

Ruth Baylis, et al., Oracle Corporation, "Oracle Database Administrator's Guide 10g Release 1 (10.1) Part No. B10739-01", Dec. 2003, pp. 1-1078.
Gordon Smith, et al., Oracle Corporation, "Oracle Database 10g Services, An Oracle White Paper", Nov. 2003, pp. 1-11.
Michele Cyran, et al., Oracle Corporation, "Oracle Database Concepts 10g Release 1 (10.1) Part No. B10743-01", Dec. 2003, pp. 1-732.

* cited by examiner

*Primary Examiner* — Asghar Bilgrami
(74) *Attorney, Agent, or Firm* — Hickman Palermo Truong Becker Bingham Wong LLP

(57) ABSTRACT

Groups of services are created based on one or both of the following: (a) what is accessed by each service, and (b) a likelihood of conflicts between accesses (e.g., a database object read operation or a database object write operation) performed by each service and accesses performed by each other service. Groups of services, which may be the groups created or subsets of those groups, are assigned to run on particular servers based on the processing power requirements of each group and the processing power available to each server. In the grouping process, accesses can be biased by giving more weight to object write operations than to object read operations, and to access operations on an index or dictionary than to access operations on a table.

41 Claims, 3 Drawing Sheets

CREATE GROUPS OF ONE OR MORE SERVICES BY GROUPING SERVICES BASED ON AT LEAST ONE OF
(A) WHICH DATA IS ACCESSED BY EACH SERVICE, AND
(B) THE COST OF CONFLICTS BETWEEN ACCESSES PERFORMED BY EACH SERVICE AND ACCESSES PERFORMED BY EACH OTHER SERVICE
202

ASSIGN THE GROUPS TO SERVERS BASED ON PROCESSING POWER REQUIREMENTS OF EACH GROUP AND PROCESSING POWER AVAILABLE TO EACH SERVER
204

AUTOMATIC ASSIGNMENT OF SERVICES TO SERVERS IN A MULTI-SERVER SYSTEM

CROSS REFERENCE TO RELATED APPLICATIONS

This application claims the benefit of priority to U.S. Provisional Patent Application No. 60/562,735 filed on Apr. 16, 2004, entitled "AUTOMATIC ASSIGNMENT OF SERVICES TO NODES IN A CLUSTER DATABASE" ; the contents of which is incorporated by this reference in its entirety for all purposes as if fully set forth herein.

FIELD OF THE INVENTION

The present invention relates generally to information processing systems and, more specifically, to automatically assigning the performance of services to servers in a multi-server system.

BACKGROUND OF THE INVENTION

A service is a logical unit of work. Services can be used to divide, into mutually disjoint classes, work that is being performed in a computing system. Each service can represent a logical business function, e.g., a workload, with common attributes, service level thresholds, and priorities. The grouping of work into services is based on attributes of the work, which might include the application function to be invoked, the priority of execution for the application function, the job class to be managed, or the data range used in the application function of a job class. For example, an electronic-business suite may define a service for each responsibility, such as general ledger, accounts receivable, order entry, and so on. A service can span multiple server instances in a clustered computing system or multiple clusters in a grid, and a single server instance can support multiple services.

Computing systems having multiple servers historically provide capabilities that allow an administrator to manually configure a mapping between services and servers (also referred to as "server instances"). Such a manual configuration may be based on system performance and/or ease of management, for example. If the mapping is not specified, all services are typically provided by all servers.

One approach to automating assignment of work in a multi-server environment attempts to group together logical transactions to minimize inter-node contention by analyzing the data access traces of an application on a single node, and providing suggestions on grouping transaction types to nodes based on the traces associated with that single node.

Based on the foregoing, there is a general need for automatically assigning services to servers in a multi-server system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is a flow diagram that illustrates a method for automatically assigning services to servers in a multi-server system, according to an embodiment of the invention.

DETAILED DESCRIPTION OF EMBODIMENTS OF THE INVENTION

Figure 1:
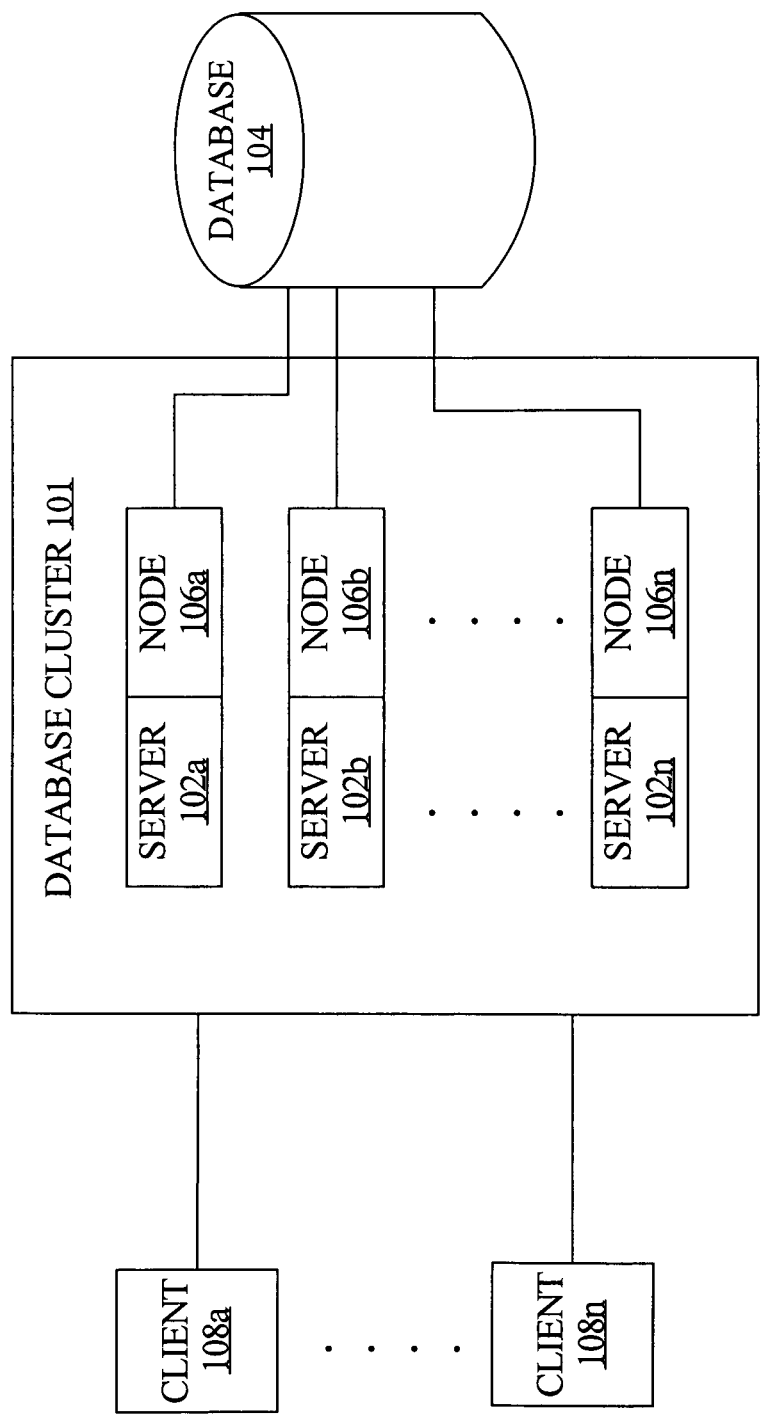
FIG. 1 is a block diagram that illustrates an operating environment in which an embodiment of the invention may be implemented.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

In many scenarios, it may be desirable to co-locate, on a given server, services that have similar access behaviors ("similar services"). For example, co-locating similar services can reduce inter-server data contention and messaging costs, and can improve hit rates in data dictionaries and data caches. Conversely, it may be desirable to run services that are dissimilar on different servers. Hence, in a system on which multiple services run on multiple servers, automatically assigning services to servers in a manner that takes into account the similarity between services can be used to maximize system performance.

Similar services can be said to have an "affinity" among each other. Throughout this description, "affinity" among services refers to services that have performed, to some degree, according to similar access behaviors.

In one embodiment, groups of services are created based on one or both of the following: (a) what is accessed by each service, and (b) the likelihood of conflicts between (b1) accesses (e.g., a database object read operation or a database object write operation) performed by each service and (b2) accesses performed by each other service. Groups of services, which may be the groups created or subsets of those groups, are assigned to run on particular servers (a technique also referred to as "load balancing") based on the processing power requirements of each group and the processing power available to each server. Whether the groups of services are created based on access patterns, access conflict factors, or both, accesses can be biased by giving more weight, generally, (1) to database object write operations than to database object read operations and (2) to access operations on an index or dictionary than to access operations on a table.

One goal of the load balancing process is to first attempt to assign the group of services with the strongest (or most) affinity to a server hosted by a node that has the requisite processing power, in order to maximize the performance benefits from the load balancing process. In situations in which it is not possible to assign the group of services with the strongest affinity to a server hosted by a node that has the requisite processing power, then various actions may be taken. For example, the service that has the weakest (or least) affinity among the services in the group may be removed from the group and the remaining subset of services from the group assigned to a server hosted by a node that has the requisite processing power. In situations in which it is not possible to assign any single service from a group of services to any server hosted by a node that has the requisite processing power, then various actions may be taken. For example, the service that requires the most processing power among the services in the group may be removed from the group and assigned to all the servers.

Operating Environment

FIG. 1 is a block diagram that illustrates one operating environment in which one embodiment of the invention may be implemented. FIG. 1 illustrates a database cluster 101 that comprises a cluster of nodes 106a-106n communicatively coupled to a database 104. Each node 106a-106n hosts one or more database servers ("server") 102a-102n. Each server 102a-102n performs one or more services for one or more clients 108a-108n. As previously described, services are logical units of work. In a database context, a service consists of one or more transactions with the database 104.

Use of element identifiers ranging from a to n, for example, servers 102a-102n, nodes 106a-106n and clients 108a-108n, does not mean that the same number of such components are required. In other words, n is not necessarily equal for the respective components. Rather, such identifiers are used in a general sense in reference to multiple similar components.

A database server 102a-102n (also referred to as a "server instance") is a combination of integrated software components and an allocation of computational resources (such as memory and processes) for executing the integrated software components on a processor, where the combination of the software and computational resources are used to manage a particular database, such as database 104. Among other functions of database management, a database server typically facilitates access to database 104 by processing requests from clients 108a-108n to access the database 104. Servers 102a-102n are hosted on node machines, such as nodes 106a-106n, which can be implemented on a conventional computer system, such as computer system 300 illustrated in FIG. 3.

Database 104 contains data and metadata that is stored on a persistent memory mechanism, such as a set of hard disks that are communicatively coupled to servers 102a-102n. Such data and metadata may be stored in database 104 logically, for example, according to relational database constructs, multidimensional database constructs, or a combination of relational and multidimensional database constructs. In an embodiment implemented in a database cluster environment, references to access refer to accessing (e.g., reading or writing) database objects that are stored in database 104.

Figure 3:
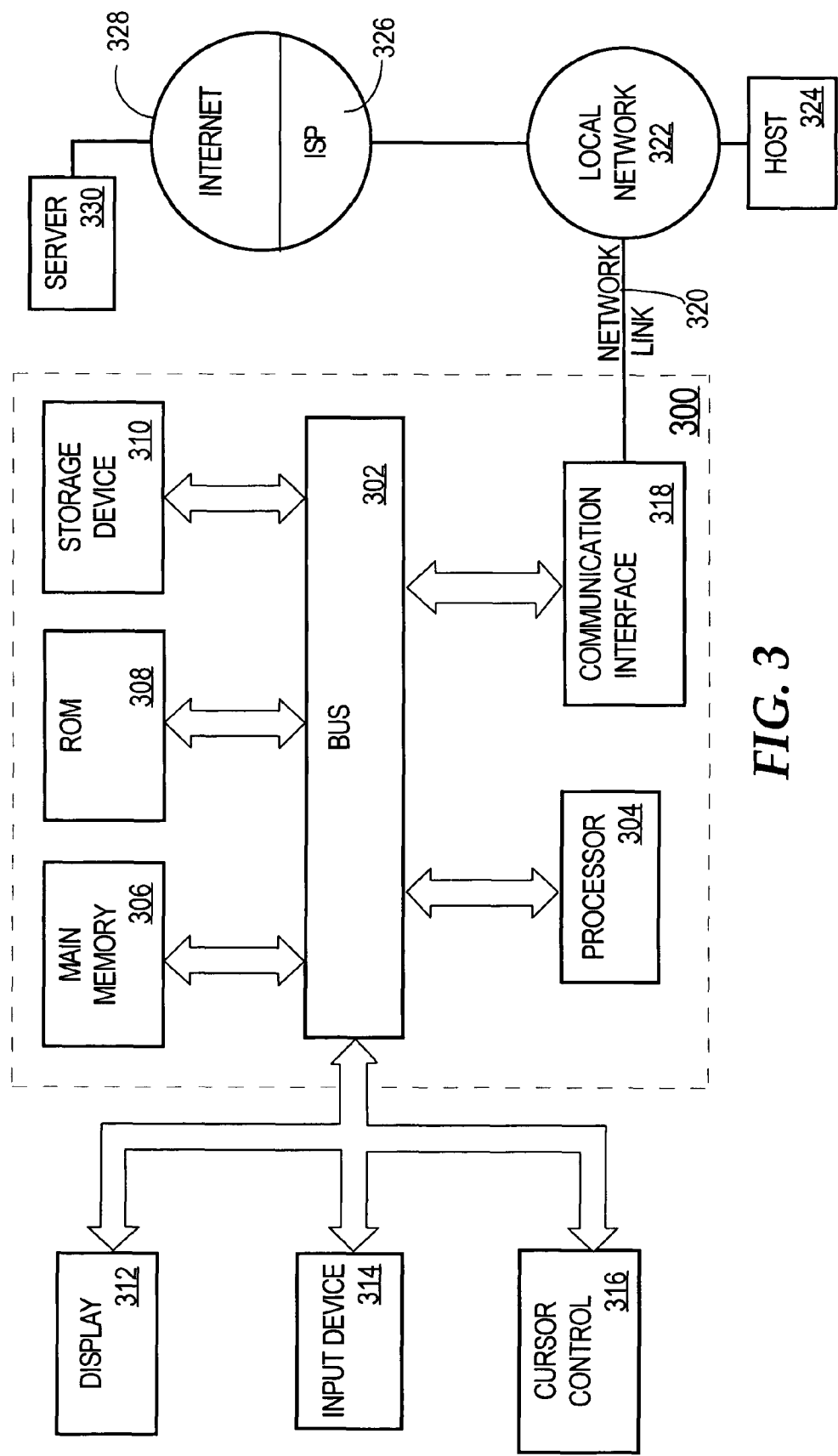
FIG. 3 is a block diagram that illustrates a computer system upon which an embodiment of the invention may be implemented.

Clients 108a, 108b are applications executed by computers, such as computer system 300 illustrated in FIG. 3. Client applications are typically application programs that request and possibly manipulate data, via a database server 102a-102n, that is stored in database 104. Non-limiting examples of client applications include a web browser executing on a desktop computer and a more programmatically complex application program executing on an application server or other mid-tier component.

In the context of a database system, automatic assignment of services to servers applies to all types of database systems, e.g., shared-nothing, shared-disk and shared cache systems. That is, localizing services based on access statistics, according to techniques described herein, is beneficial to systems regardless of the type of system.

Method for Automatically Assigning Services to Servers

FIG. 2 is a flow diagram that illustrates a method for automatically assigning services to servers in a multi-server system. The method of FIG. 2 may be performed, for example, by an application (e.g., "clusterware") that manages a multi-server system ("system").

At block 202, one or more groups of services are created by grouping services based on at least one of the following: (a) what is accessed by each service being grouped, and (b) the likelihood of access conflicts between (b1) accesses performed by each service being grouped and (b2) accesses performed by each other service being grouped. Block 202 refers to grouping services based on at least one of two independent methods for computing affinity between services. In respective embodiments, services may be grouped based solely on (1), solely on (2), and on both (1) and (2).

Computing Affinity Between Services

According to one embodiment, affinity between services is determined based on data collected during operation of a multi-server system.

Collecting Information

In one embodiment, the following information is periodically retrieved (e.g., from one or more background processes) and aggregated over all servers of the multi-server system, such as servers 102a-102n (FIG. 1). Specifically, for each service, information is retrieved concerning (1) the number of read operations and write operations per object that is accessed by the service, and (2) the total processing power used by the service. For example, a data segment is one type of object that can be accessed by a service. Hence, in the context of a database system, if a database table is partitioned, the different partitions would have different object numbers and would, therefore, be considered different objects. If the client session accesses a dictionary object, such as a sequence, the object number would be the object number of the sequence.

There are many types of objects that can be accessed by a service. In the context of a database, accessing objects does not necessarily mean accessing data values, such as data stored in a relational table. Rather, accessing objects also includes accessing objects associated with the structure of data. Non-limiting examples of database objects that can be accessed by services include indexes, tables, dictionaries, views, materialized views, and the like.

One possible non-limiting approach to collecting the foregoing information utilizes a two-dimensional in-memory data structure that is indexed by service (e.g., S1) and by object number or object name (e.g., O1). The two-dimensional structure can be represented using standard techniques, for non-limiting examples, hash tables, linked lists, arrays, or a combination of these data structures. Each server session executes a transaction on behalf of a service, where the service is specified by a client 108a-108n. When the server session needs to read or write a block, the value for the tuple (service-name, object-name) is incremented (note that the value is incremented regardless of whether or not the block is in cache). The server session also computes the CPU used for each request using an OS call, and adds the CPU used to the processing power requirement of the service, i.e., the processing power used by the service.

Access Pattern Similarity

In one embodiment, groups of services are created based on what is accessed by each service that runs on the system, such as database objects. In a related embodiment, groups of services are created by grouping services based on the services within a group having similar access patterns regarding what is accessed by each service, i.e., access pattern similarity.

For purposes of explanation, assume there are n servers in the system, s services (S1,S2 . . . , Ss) performed, and o objects (O1,O2, . . . , Oo) accessed. The object access pattern for each service can be represented as a string of characters ("access string"), where each character represents a read operation or a write operation to an object, and the characters in the access string are sorted by object number. For example, if a service performs three reads of O1, two writes to O1, three reads of O2, three writes to O2, and one write to Oo, then the access string could be represented as RO1RO1RO1WO1WO1RO2RO2RO2WO2WO2WO2WOo. RO1 represents a read of object O1, WO1 represents a write of object O1, and so on.

If a service writes to object O1 one million times during the time period in which the access information was collected, the character WO1 will be repeated one million times. In one embodiment, the access string is compressed. In a related embodiment, the access string is compressed by representation in logarithmic scale, which provides a more efficient process (e.g., fewer data points to process) and a better similarity grouping based on the normalization of the compressed strings.

Similarity between two services can be calculated based on the similarity between their access strings. Similarity of strings can be computed using conventional or standard matching algorithms, such as those based on dynamic programming techniques. In one embodiment, in the context of a database system, the matching algorithm is weighted as follows. If the weight for a match between two characters is defined by the function M, then choose M such that $M(WOi, WOi) > M(WOi, ROi) > M(WOt, WOt) > M(WOt, ROt) > M(ROi, ROi) > M(ROt, ROt)$, where Oi is an index or dictionary object and Ot is a table. Consequently, since two services may access the same table but access different indexes on that table, services that modify the same index object are treated as being more similar than services that modify the same table because index contentions are typically more problematic to system performance than are table contentions. Furthermore, services performing write operations on a given object may be treated as being more similar than services that perform read operations on the given object. The degree of similarity among services reflects the relative affinity among those services.

The best match among all pairs of services is determined using a matching algorithm. The two services that have the best match are removed from processing and their strings are replaced with a consensus string that represents the accesses of both services. A simple concatenation of base strings is not recommended for use as the consensus string. The matching algorithm, a variant thereof, or, for example, dynamic programming techniques, can be used to generate the consensus string.

This matching process is repeated, incorporating the consensus strings, until a certain number of consensus strings are generated. In one embodiment, the matching process is repeated until there are n strings, where n is the number of servers in the system. Each consensus string is associated with a set of services that are associated with the access strings from which the consensus string was derived. At this point in the process, the set of s services has been divided into n groups such that each group of services has maximum affinity among the constituent services of the group. For purposes of explanation, call these n service groups SG1, SG2 . . . SGn. Each group is associated with a respective consensus string, and the identities of the services from which the consensus string was derived are tracked while grouping the services into the groups. Note that one or more of the final strings may not actually be a consensus string, but may be the base string associated with a single service that has little or no similarity to any other services.

Probability of Access Conflicts

In one embodiment, groups of similar services are created based on the likelihood of access conflicts between services, where two accesses are conflicting if they access the same object. Read operations on the same object do not conflict in the locking sense, however, read operations are considered a conflict for the purpose of computing affinity among services. In one embodiment, in the context of a database system, the likelihood of a conflict for an index object is considered higher than the likelihood of a conflict for a table. The temporal aspect of the access statistics is not considered, i.e., the likelihood of conflicts between services is approximated by computing the probability of conflict of a random access made by each service. Hence, use of probabilities of conflicts based on the access statistics, without the temporal aspect, provides a somewhat conservative estimate because, in computing the probabilities of conflicts of random accesses, such accesses are assumed to happen at the same time.

Two services are similar if the probability that their accesses will conflict is high. In one embodiment, a weighted probability is used to compute a "cost of conflicts" between two services, as described hereafter. Groups of services are formed such that the probability of conflicts between a service and other services in the same group is relatively higher than the probability of conflicts between the service and services in other groups.

Using P as a short notation for probability, the cost of conflicts between services S1 and S2 can be computed, based on the same raw access information used in the access pattern similarity processing (although not materialized as a string), as:

$$P(S1 \text{ writes to } O1 \text{ AND } S2 \text{ writes to } O1)*\text{Weight } (O1, \text{Write-Write})+P(S1 \text{ writes to } O1 \text{ AND } S2 \text{ reads from } O1)*\text{Weight } (O1, \text{Read-Write})+P(S1 \text{ reads from } O1 \text{ AND } S2 \text{ writes to } O1)*\text{Weight } (O1, \text{Read-Write})+P(S1 \text{ reads from } O1 \text{ AND } S2 \text{ reads from } O1)*\text{Weight } (O1, \text{Read-Read})+P(S1 \text{ writes to } O2 \text{ AND } S2 \text{ writes to } O2)*\text{Weight } (O2, \text{Write-Write})+P(S1 \text{ writes to } O2 \text{ AND } S2 \text{ reads from } O2)*\text{Weight } (O2, \text{Read-Write}) \ldots$$

and so on for all of the objects under consideration.

The weight function, "Weight", uses the object number or object name (generally, "object identifier") as a function argument. The weight function can determine the object type (e.g., table, index, etc.) from the object identifier by using a dictionary. In one embodiment, the weight function uses additional metrics to return a value for the function, for example, some measure of the importance of the object. The second argument used by the weight function (i.e., Read-Read, Write-Write, etc.) is the type of conflict between the services, for the relevant object.

The probability function, P, returns the probability that the two operations on the relevant object will occur at the same time. As explained herein, since the temporal information is not retained in this approach to computing similarity of services, the probability function provides a relatively conservative estimate that the two operations will occur at the same time.

For example, $$P(S1 \text{ writes to } O1 \text{ AND } S2 \text{ writes to } O1) = P(S1 \text{ writes to } O1)*P(S2 \text{ writes to } O1),$$

where $P(S1 \text{ writes to } O1)$ = the number of writes to $O1$ by $S1$/total number of object accesses by $S1$; and $P(S2 \text{ writes to } O1)$ = the number of writes to $O1$ by $S2$/total number of object accesses by $S2$.

In one embodiment, the weights are biased such that a write-write conflict for an index object is weighted higher than a write-write conflict for a table object, and so on. In one embodiment, the weights are biased such that a write-write conflict for a given object is weighted higher than a write-read or read-write conflict for the object, and so on. Consequently, services that access the same index object are treated as being more similar (i.e., the services have a higher cost of conflicts) than services that access the same table, and services performing write operations on a given object are treated as being more similar than services that perform read operations on the given object, where the degree of similarity reflects the relative affinity among the services.

The costs of conflicts are computed among all pairs of services. The two services with the highest cost of conflict are the first members of a group, i.e., a group of services with a high affinity, and are removed from the processing set. The access statistics for these two services are replaced with aggregated access statistics for the two services and this conflict cost computation process is repeated until there are a certain number of groups of services. In one embodiment, the process is repeated until there are n access statistics, and, therefore n groups of one or more services, where n is the number of servers in the system. At this point in the process, the set of s services has been divided into n groups such that each group of services has maximum affinity among the constituent services of the group. For purposes of explanation, call these n service groups SG1, SG2 . . . SGn.

With both the "access pattern similarity" approach and the "probability of access conflicts" approach, the affinity among the services in a given group of services, as created at block 202, can be distilled into a single number. For example, the affinity among a group of services may be represented as (1) the weighted probability of an access conflict among the services in the given group, or (2) a number generated by the matching algorithm to characterize the relative similarity of access patterns among the services in the given group. Hence, the relative affinity of each of the groups is determined, which is useful in load balancing and during reconfigurations, which are described hereafter.

Returning to FIG. 2, at block 204, groups of services are assigned to servers based on (a) processing power requirements of each group and (b) processing power available to each server. For example, the groups of services that were created at block 202 (or subsets of those groups, described hereafter) are assigned to servers, such as servers 102a-102n (FIG. 1), based on the processing power needed to run the services in the group and the processing power of the nodes 106a-106n that host the servers 102a-102n.

Load Balancing Services Across Servers

In one embodiment, the load generated by a service is approximated using the cumulative processing power (e.g., CPU usage) used by all the sessions in the service. Since not all services require the same amount of processing power, a mapping of services to servers, which maximizes affinity, may skew the load. An objective function for load skew is the standard deviation of the processing power used among the groups of services. If the skew is high, then the services may be assigned to servers according to one embodiment, as follows.

The processing power that is available for use by each server is computed. In the case of symmetric servers, this value is simply the total processing power used by all s services divided by the number of servers n. If the servers are asymmetric, for example, because the number of CPUs is different for different nodes or the processing cycle speed rating is different for different nodes, the processing power per server can be weighted accordingly. Note that the relative processing capacities of the nodes may be used for load balancing, rather than the absolute processing capacities of the nodes.

In both approaches to computing affinity between services described herein, the n groups of services can be ordered based on affinity. In one embodiment, the service assignment process begins with the group with the strongest affinity, say SG1, with an attempt to fit this group into a server hosted by a node that has the requisite processing power capacity. If the entire group SG1 does not fit, then the service in SG1 that has the least affinity to the remaining services in SG1 is removed, and another attempt is made at fitting the subset of the group (i.e., the remaining services other than the service removed) into a server hosted by a node that has the requisite processing power capacity.

The described process results in either (a) assigning a subset of SG1 to a server, or (b) determining that none of the services within SG1 can be handled by a single server. In one embodiment, with case (a) the subset of SG1 is assigned to a server, this subset is removed from the set of services, the service groups are recomputed (e.g., using access pattern similarity and/or cost of conflicts) and the assignment (i.e., load balancing) procedure is repeated. In one embodiment, with case (b) the service in SG1 that uses the maximum processing power, say S1, is assigned to all the servers, S1 is removed from the set of services, the service groups are recomputed and the assignment procedure is repeated.

Generally, a goal of the preceding algorithm is to assign each service group to a single server. If it is not possible to assign a given group to a single server, then, in one embodiment, that group is decomposed and one or more services in that group is assigned to all servers. In one embodiment, no attempt is made to co-locate services within a service group across a group of servers. For example, if two services S1 and S2 have a strong affinity but cannot both be assigned to a single server because the processing power required by the two services exceeds the largest node's capacity, no attempt is made to co-locate S1 and S2 on a particular set of servers. In an alternative embodiment, an attempt is made to co-locate on a set of servers the services that have a strong affinity but cannot both be assigned to a single server.

In one embodiment, if a service group cannot be assigned to any single instance, servers are "combined" into a "super" server, such that the combined capacity of the nodes on which the super server executes exceeds the processing power consumed by the service group (preferably by the smallest amount). Thus, when all services have been assigned, the process can be recursively executed on each super server for the service group that has been assigned to the super server. In one embodiment, servers are not combined and a service is not assigned to all servers within the super server if the processing power required by the service exceeds the capacity of every server within the super server.

The two-step iterative approach, described above, of (a) computing the affinity, and (b) factoring in the load, is presented for non-limiting purposes of explanation. The load issues can be factored into the first step of determining service groups, such as at block 202 (FIG. 2). For example, when the groups of services are being created, a group can be declared as "full" when the cumulative processing power requirements of that group exceed the maximum processing power available to each respective server. Conversely, if the processing power required by a service exceeds the maximum processing power available to any server, that service can be immediately assigned to all servers and the service removed from the affinity computation.

In one embodiment, a reassignment of services to servers, as described herein, can be explicitly triggered if the processing load on a server exceeds or falls below a certain threshold. In one embodiment, if there is a spike in demand for a particular service, the assignment process automatically assigns the service to multiple servers. Likewise, if the demand drops, the process determines that the service can be reassigned to a single server.

With a multi-server reconfiguration operation, such as with a reconfiguration of a database cluster such as that illustrated in FIG. 1, a goal is to cause the least perturbation to the services. As a matter of policy, a full reassignment can be recomputed at infrequent intervals or off-peak hours.

In one embodiment, in response to termination of a node, a reconfiguration of the system is triggered. For example, the affinity between the services that were assigned to the server(s) hosted by the terminated node and the services in the surviving servers is computed, and the services that were assigned to the server(s) hosted by the terminated node are reassigned, using the process described herein. If, following a node termination, avoidance of execution of the process illustrated in FIG. 2 is desired, it is possible to pre-compute these assignments for each instance. That is, assignments of groups of services to servers, based on termination of respective nodes in the system, can be pre-computed (i.e., before the respective nodes actually terminate) so that upon such a termination, the affected services can be quickly reassigned to one or more servers hosted by a surviving node or nodes.

In one embodiment, in response to addition of a node to the system, the service that has the least affinity to the remaining subset of services in a respective server to which the service group is assigned, is relocated to the new server. This procedure can be repeated until the weighted load assigned to each server approaches convergence.

To summarize some non-limiting benefits that the techniques described herein may offer in comparison with other approaches, these techniques are automatic and work directly on a clustered system rather than on a scaled-down single node system with the hope that the workload on the single node system is a true scaled-down version of the larger clustered workload. In addition, these techniques address scenarios in which different services may require different amounts of processing power, where prior approaches do not consider the load generated by the services. Still further, these techniques do not require extensive tracing, such as with approaches that use post-mortem analysis of the traces generated on a single node, for application to the entire multi-node system.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Aternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for automatically assigning a plurality of services to a plurality of servers, the method comprising the computer-implemented steps of:
   creating groups of one or more services by
      grouping services of said plurality of services based on at least one of
      (a) what is accessed by each service, or
      (b) likelihood of conflicts between accesses performed by each service and accesses performed by each other service; and
   assigning said groups to servers of said plurality of servers based on processing power requirements of each group and processing power available to each server of said plurality of servers;
   wherein the steps of creating and assigning are performed by one or more computing devices.

2. The method of claim 1, wherein the step of creating groups comprises creating groups based on what is accessed by each service, based on which objects in a database are accessed by each service.

3. The method of claim 1, wherein the step of creating groups comprises creating groups based on likelihood of conflicts between accesses performed by each service and accesses performed by each other service, based on conflicts between accesses of objects in a database.

4. The method of claim 1,
   wherein the step of creating groups comprises creating initial groups of one or more services; and
   wherein the step of assigning said groups comprises
      if an initial group cannot be assigned to a particular server of said plurality of servers because said processing power requirements of said initial group exceeds said processing power available to said particular server, then subdividing said initial group into sub-groups of one or more services; and
      assigning a first sub-group to said particular server and a second sub-group to another server of said plurality of servers that is not said particular server.

5. The method of claim 4,
   wherein the step of creating groups comprises creating groups based only on (a) what is accessed by each service; and
   wherein the step of subdividing said initial group comprises
      creating said first sub-group by removing, from said initial group, a first service that has the least similarity in what is accessed by said first service in comparison with what is accessed by services, of said initial group, other than said first service; and
      creating said second sub-group comprising said first service.

6. The method of claim 4,
   wherein the step of creating groups comprises creating groups based only on (b) likelihood of conflicts between accesses performed by each service and accesses performed by each other service; and
   wherein the step of subdividing said initial group comprises
      creating said first sub-group by removing, from said initial group, a first service that has the least cost of conflicts between accesses performed by said first service and accesses performed by services, of said initial group, other than said first service; and
      creating said second sub-group comprising said first service.

7. The method of claim 1,
   wherein the step of assigning said groups comprises
      if no services, from a group of said groups, can be assigned to any single server of said plurality of servers because said processing power requirement of of each service from said group exceeds said processing power available to each server, then assigning a first service from said group to all servers of said plurality of servers;
   wherein said first service is a service having a processing power requirement that equals or exceeds said processing power requirement of each service, of said group, other than said first service.

8. The method of claim 1,
wherein the step of assigning said groups comprises
attempting to assign each of said groups to a respective single server of said plurality of servers; and
if a group of said groups cannot be assigned to any single server of said plurality of servers because said processing power requirement of said group exceeds said processing power available to each server, then assigning said group to two or more servers of said plurality of servers, wherein said processing power available to said two or more servers equals or exceeds said processing power requirement of said group.

9. The method of claim 1, further comprising the computer-implemented step of:
computing said processing power requirements of each service in each group by summing the processing power used by all sessions in said service.

10. The method of claim 1, wherein the step of creating said groups comprises creating groups based only on (a) what is accessed by each service.

11. The method of claim 10, wherein the step of creating said groups comprises:
representing database object access statistics for said plurality of services as respective strings; and
comparing strings to determine similarity between object access patterns of services that are associated with each of said strings being compared.

12. The method of claim 1, wherein the step of creating said groups comprises creating groups based only on (b) likelihood of conflicts between accesses performed by each service and accesses performed by each other service.

13. The method of claim 1, wherein the step of creating said groups comprises creating groups based on (a) what is accessed by each service and (b) likelihood of conflicts between accesses performed by each service and accesses performed by each other service.

14. The method of claim 1, wherein the step of creating said groups comprises
creating groups based only on (a) what is accessed by each service, by grouping said services based on said services within a group having similar access patterns regarding what database objects are accessed by each of said services.

15. The method of claim 14, further comprising the computer-implemented step of:
generating an access pattern for each service based on past accesses to database objects;
generating weighted access patterns by weighting, within respective access patterns, (1) write operations on an index or a data dictionary higher than read operations on said index or said data dictionary, (2) write operations on an index or a data dictionary higher than write operations on a table, (3) write operations on a table higher than read operations on said table, and (4) read operations on an index or a data dictionary higher than read operations on a table; and
determining similar access patterns by comparing respective weighted access patterns for services.

16. The method of claim 1, wherein the step of creating said groups comprises
creating groups based only on (b) likelihood of conflicts between accesses performed by each service and accesses performed by each other service, by grouping said services based on said services within a group having a high likelihood of conflicts between accesses performed by services within said group and accesses performed by other services within said group, relative to a likelihood of conflicts between accesses performed by services within said group and accesses performed by services not within said group.

17. The method of claim 16, wherein the step of creating groups comprises:
generating weighted probabilities of conflicts between accesses performed by each service and accesses performed by each other service, based on weighting (1) write conflicts on an index or a data dictionary higher than read conflicts on said index or said data dictionary, (2) write conflicts on an index or a data dictionary higher than write conflicts on a table, (3) write conflicts on a table higher than read conflicts on said table, and (4) read conflicts on an index or a data dictionary higher than read conflicts on a table; and
computing said likelihoods of conflicts using said weighted probabilities of conflicts.

18. The method of claim 1, wherein said plurality of servers are configured as a database cluster in which each server of said plurality of servers manages data stored in a same database.

19. The method of claim 1, wherein the step of assigning comprises
pre-computing an assignment of said groups to servers based on termination of a particular node of a plurality of nodes on which said plurality of servers execute.

20. The method of claim 19, wherein the step of assigning comprises in response to termination of said particular node, assigning said groups according to said assignment.

21. A computer system that can automatically assign a plurality of services to a plurality of servers, the system comprising:
one or more processors that are configured to perform the step of creating groups of one or more services by:
grouping services of said plurality of services based on at least one of:
(a) what is accessed by each service, or
(b) likelihood of conflicts between accesses performed by each service and accesses performed by each other service; and
assigning said groups to servers of said plurality of servers based on processing power requirements of each group and processing power available to each server of said plurality of servers.

22. One or more non-transitory computer-readable media carrying instructions for automatically assigning a plurality of services to a plurality of servers, wherein the-instructions, when executed by one or more processors, cause:
creating groups of one or more services by
grouping services of said plurality of services based on at least one of
(a) what is accessed by each service, or
(b) likelihood of conflicts between accesses performed by each service and accesses performed by each other service; and
assigning said groups to servers of said plurality of servers based on processing power requirements of each group and processing power available to each server of said plurality of servers.

23. The one or more non-transitory computer-readable media of claim 22, wherein the creating groups comprises creating groups based on what is accessed by each service, based on which objects in a database are accessed by each service.

24. The one or more non-transitory computer-readable media of claim 22, wherein creating groups comprises creating groups based on likelihood of conflicts between accesses performed by each service and accesses performed by each other service, based on conflicts between accesses of objects in a database.

25. The one or more non-transitory computer-readable media of claim 22, wherein:
creating groups comprises creating initial groups of one or more services; and
assigning said groups comprises:
if an initial group cannot be assigned to a particular server of said plurality of servers because said processing power requirements of said initial group exceeds said processing power available to said particular server, then subdividing said initial group into sub-groups of one or more services; and
assigning a first sub-group to said particular server and a second sub-group to another server of said plurality of servers that is not said particular server.

26. The one or more non-transitory computer-readable media of claim 25, wherein:
creating groups comprises creating groups based only on (a) what is accessed by each service; and
subdividing said initial group comprises:
creating said first sub-group by removing, from said initial group, a first service that has the least similarity in what is accessed by said first service in comparison with what is accessed by services, of said initial group, other than said first service; and
creating said second sub-group comprising said first service.

27. The one or more non-transitory computer-readable media of claim 25, wherein:
creating groups comprises creating groups based only on (b) likelihood of conflicts between accesses performed by each service and accesses performed by each other service; and
subdividing said initial group comprises:
creating said first sub-group by removing, from said initial group, a first service that has the least cost of conflicts between accesses performed by said first service and accesses performed by services, of said initial group, other than said first service; and
creating said second sub-group comprising said first service.

28. The one or more non-transitory computer-readable media of claim 22, wherein assigning said groups comprises:
if no services, from a group of said groups, can be assigned to any single server of said plurality of servers because said processing power requirement of each service from said group exceeds said processing power available to each server, then assigning a first service from said group to all servers of said plurality of servers;
wherein said first service is a service having a processing power requirement that equals or exceeds said processing power requirement of each service, of said group, other than said first service.

29. The one or more non-transitory computer-readable media of claim 22, wherein assigning said groups comprises:
attempting to assign each of said groups to a respective single server of said plurality of servers; and
if a group of said groups cannot be assigned to any single server of said plurality of servers because said processing power requirement of said group exceeds said processing power available to each server, then assigning said group to two or more servers of said plurality of servers, wherein said processing power available to said two or more servers equals or exceeds said processing power requirement of said group.

30. The one or more non-transitory computer-readable media of claim 22, wherein the instructions, when executed by the one or more processors, further cause:
computing said processing power requirements of each service in each group by summing the processing power used by all sessions in said service.

31. The one or more non-transitory computer-readable media of claim 22, wherein creating said groups comprises creating groups based only on (a) what is accessed by each service.

32. The one or more non-transitory computer-readable media of claim 31, wherein creating said groups comprises:
representing database object access statistics for said plurality of services as respective strings; and
comparing strings to determine similarity between object access patterns of services that are associated with each of said strings being compared.

33. The one or more non-transitory computer-readable media of claim 22, wherein creating said groups comprises creating groups based only on (b) likelihood of conflicts between accesses performed by each service and accesses performed by each other service.

34. The one or more non-transitory computer-readable media of claim 22, wherein creating said groups comprises creating groups based on (a) what is accessed by each service and (b) likelihood of conflicts between accesses performed by each service and accesses performed by each other service.

35. The one or more non-transitory computer-readable media of claim 22, wherein creating said groups comprises creating groups based only on (a) what is accessed by each service, by grouping said services based on said services within a group having similar access patterns regarding what database objects are accessed by each of said services.

36. The one or more non-transitory computer-readable media of claim 35, wherein the instructions, when executed by the one or more processors, further cause:
generating an access pattern for each service based on past accesses to database objects;
generating weighted access patterns by weighting, within respective access patterns, (1) write operations on an index or a data dictionary higher than read operations on said index or said data dictionary, (2) write operations on an index or a data dictionary higher than write operations on a table, (3) write operations on a table higher than read operations on said table, and (4) read operations on an index or a data dictionary higher than read operations on a table; and
determining similar access patterns by comparing respective weighted access patterns for services.

37. The one or more non-transitory computer-readable media of claim 22, wherein creating said groups comprises
creating groups based only on (b) likelihood of conflicts between accesses performed by each service and accesses performed by each other service, by grouping said services based on said services within a group having a high likelihood of conflicts between accesses performed by services within said group and accesses performed by other services within said group, relative to a likelihood of conflicts between accesses performed by services within said group and accesses performed by services not within said group.

38. The one or more non-transitory computer-readable media of claim 37, wherein creating groups comprises:
  generating weighted probabilities of conflicts between accesses performed by each service and accesses performed by each other service, based on weighting (1) write conflicts on an index or a data dictionary higher than read conflicts on said index or said data dictionary, (2) write conflicts on an index or a data dictionary higher than write conflicts on a table, (3) write conflicts on a table higher than read conflicts on said table, and (4) read conflicts on an index or a data dictionary higher than read conflicts on a table; and
  computing said likelihoods of conflicts using said weighted probabilities of conflicts.

39. The one or more non-transitory computer-readable media of claim 22, wherein said plurality of servers are configured as a database cluster in which each server of said plurality of servers manages data stored in a same database.

40. The one or more non-transitory computer-readable media of claim 22, wherein the step of assigning comprises
  pre-computing an assignment of said groups to servers based on termination of a particular node of a plurality of nodes on which said plurality of servers execute.

41. The one or more non-transitory computer-readable media of claim 40, wherein assigning comprises, in response to termination of said particular node, assigning said groups according to said assignment.

\* \* \* \* \*

UNITED STATES PATENT AND TRADEMARK OFFICE
CERTIFICATE OF CORRECTION

PATENT NO.        : 8,560,690 B2                                                Page 1 of 1
APPLICATION NO.   : 10/899680
DATED             : October 15, 2013
INVENTOR(S)       : Chandrasekaran et al.

It is certified that error appears in the above-identified patent and that said Letters Patent is hereby corrected as shown below:

In the Specification

Column 11, line 38, delete "Aternatives" and insert -- Alternatives --, therefor.

In the Claims

Column 12, line 61, in Claim 7, delete "of of" and insert -- of --, therefor.

Column 14, line 50, in Claim 22, delete "the-instructions," and insert -- the instructions, --, therefor.

Signed and Sealed this
Third Day of June, 2014

Michelle K. Lee
*Deputy Director of the United States Patent and Trademark Office*